United States Patent Office 3,179,367
Patented Apr. 20, 1965

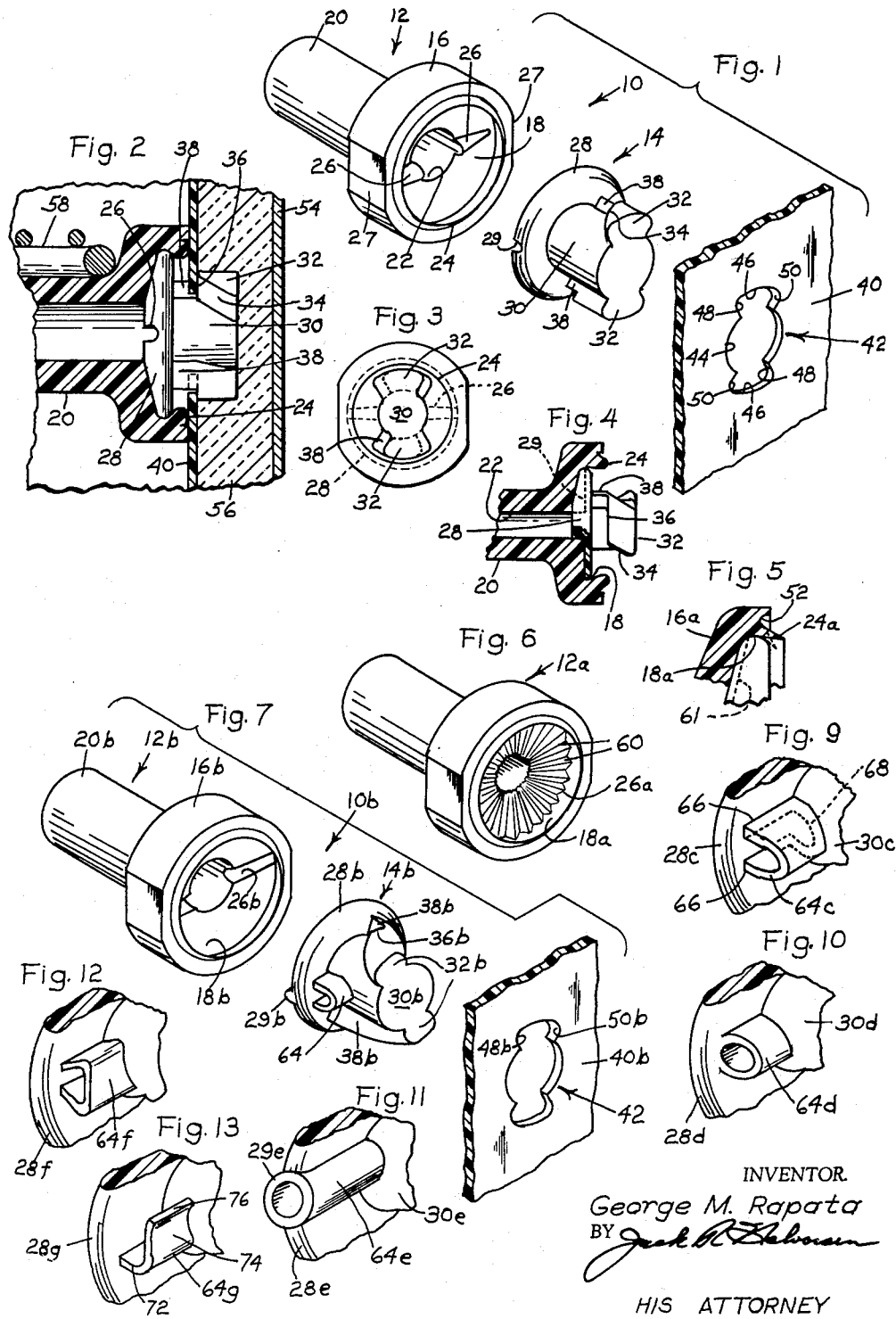
April 20, 1965 — G. M. RAPATA — 3,179,367
PLASTIC QUARTER TURN SHELF SUPPORT
Filed April 11, 1963 — 4 Sheets-Sheet 1
INVENTOR.
George M. Rapata
HIS ATTORNEY

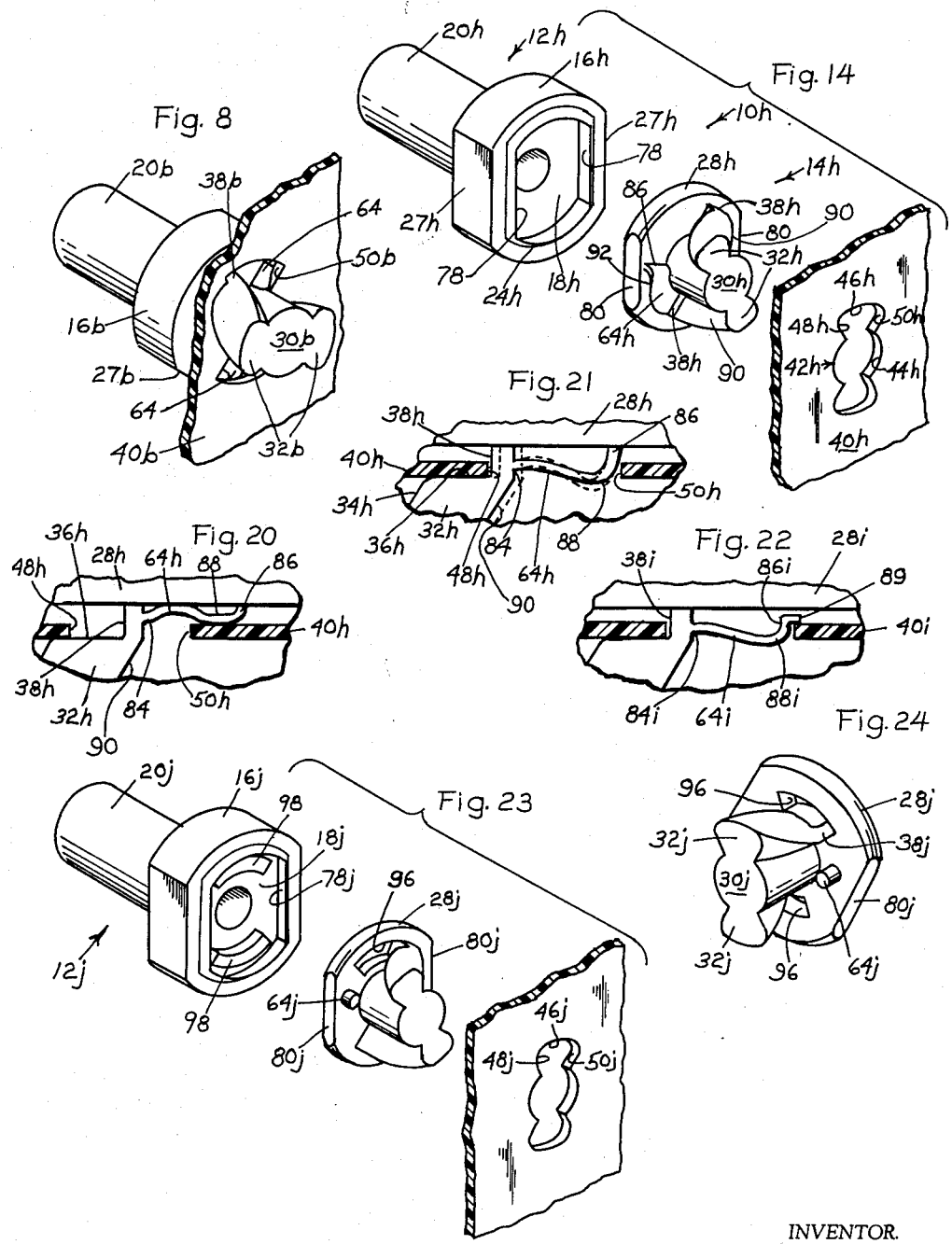

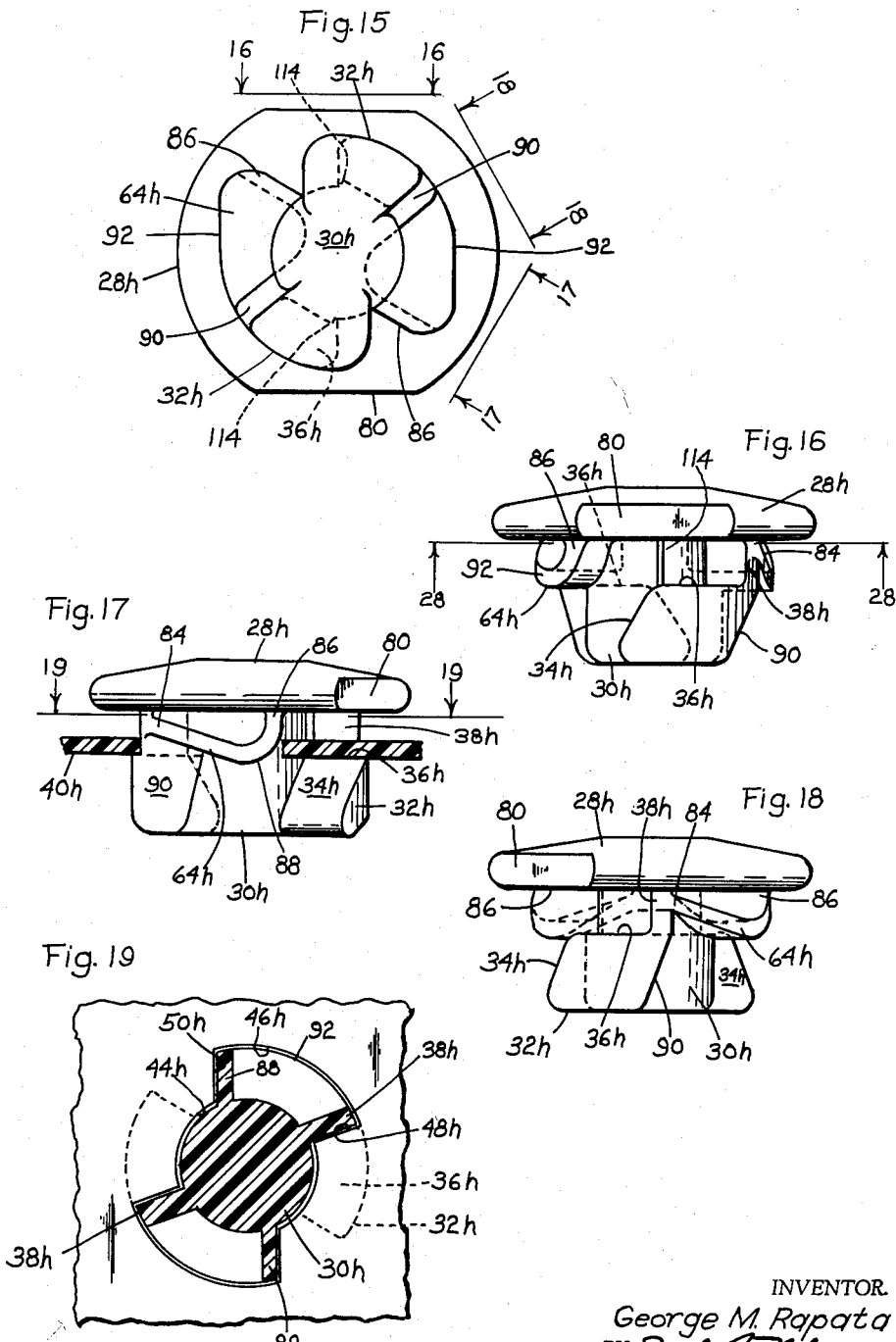

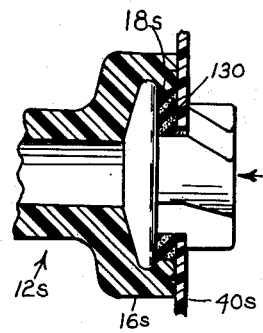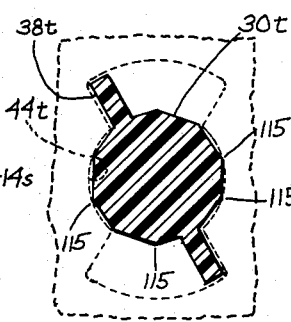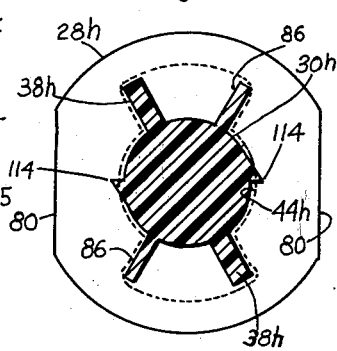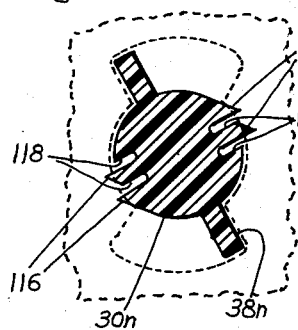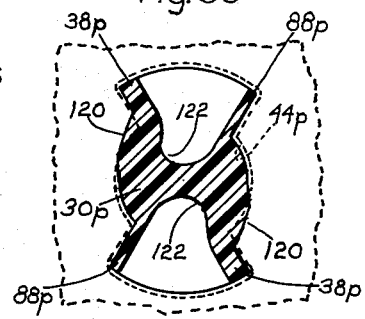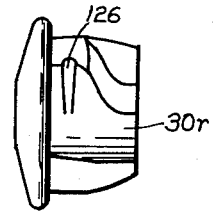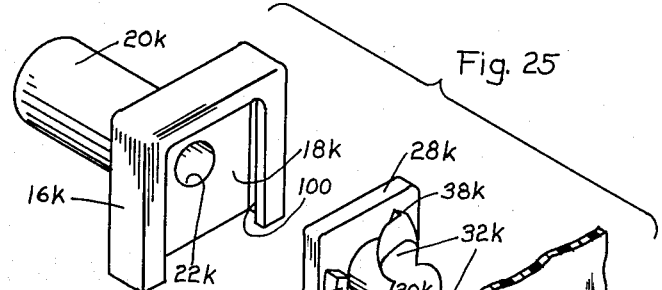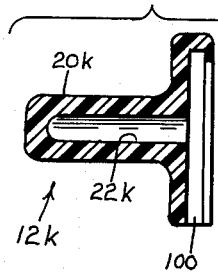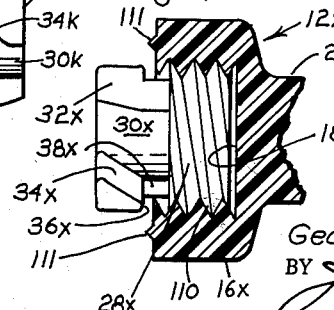

3,179,367
PLASTIC QUARTER TURN SHELF SUPPORT
George M. Rapata, Park Ridge, Ill., assignor to Illinois Tool Works Inc., Chicago, Ill., a corporation of Delaware
Filed Apr. 11, 1963, Ser. No. 272,472
34 Claims. (Cl. 248—239)

This invention relates to an improved fastener support. In the art of fastening, it is often necessary to provide means extending from a panel surface to facilitate supporting an independent third member. For the purposes of this specification, and as by way of an example, the discussion shall be directed to the so-called "blind" 'type of fastener which can be applied from one side of a panel without the necessity of performing any function on the back side of the panel. In addition, the examples set forth in the specification are directed toward the use of a blind quarter turn fastener type of support for the purpose of supporting shelves under sanitary conditions, as in a refrigerator.

Present day food cooling means such as refrigerators and freezers have their inner liner, which comprises the interior wall surfaces of the device, fabricated of thin sheet stock of either metal or plastic. The metal liners are most often covered with a coating of enamel or porcelain-like material for decorative effects and sanitary reasons while plastic liners, of course, do not require such a coating. To facilitate the mounting of shelves and other storing facilities it is necessary to provide support means extending inwardly into the refrigerator from the inner liner. To accomplish the mounting of these supports the inner liner is perforated with suitable apertures, one type of which will be discussed in greater detail hereinbelow, to facilitate the mounting of the support members on the wall. Today most of the inner liners are plastic which is relatively thin in cross section to conserve on space and materials.

Heretofore, the trade has utilized both metallic and plastic types of support fasteners. With the advent of the all plastic inner liner, as well as the trend on the part of some manufacturers to produce a foamed type of insulation, which is foamed in place between the outer liner and the inner liner, the fasteners produced heretofore have produced undesirable results. Some of the metallic forms deform and crack the plastic liners and also set up stresses which ultimately create fractures. Other types of fasteners use rivet fasteners which utilize axially moved pins to set the rivet. Because of the thinness of the inner liner, the pull up or the axial blow on the pin required to set the rivet prongs results in a deformation of these thin panels.

It is a primary object of this invention to provide a support member with associated fastening means adapted to be applied to a thin work panel, such as a refrigerator liner, which will overcome the major difficulties enumerated hereinabove.

A further object is to provide a multi-piece plastic sanitary self-retained support, capable of repeated removal and re-use.

Another object of the invention is to provide a fastener which is economical to produce, due to the fact that differing materials can be utilized in the differing parts for different functional necessities.

Another object of the invention is to provide a fastener which is capable of sealing the aperture in which it is inserted so as to permit preassembly of the fastener to the liner to seal the aperture and to permit foaming-in-place techniques mentioned hereinabove.

Still another object of the invention is to provide a support fastener which can be manufactured of plastic materials and which because of its inherent structural features permit the use of rugged tooling which will stand up under repeated use and will require minimal maintenance.

Still other objects of the invention will become apparent to those skilled in the art when the accompanying specification is read in conjunction with the drawings wherein:

FIG. 1 is a perspective exploded view of an embodiment of the present invention including support, stud and panel means;

FIG. 2 is an elevation in partial section of the device shown in FIG. 1 shown in installed position in a work panel;

FIG. 3 is an end view of the device shown in FIGS. 1 and 2;

FIG. 4 is an elevation in partial section showing the support and stud elements in partial assembly;

FIG. 5 is a modification of the assembly retaining means located in the support element base;

FIG. 6 is a further embodiment of the support element showing an alternate means for preventing rotation between the support element and the stud element;

FIG. 7 is an exploded perspective view of another embodiment of the present invention illustrating a further form of anti-rotation means plus detent means for prevention of retrograde rotation;

FIG. 8 is a perspective view of the device shown in FIG. 7 when assembled and installed in a panel;

FIGS. 9–13 show details of modifications to the detent locking means;

FIG. 14 is an exploded perspective view of still another embodiment of the present invention;

FIG. 15 is an end view of the stud element of the device shown in FIG. 14;

FIG. 16 is an elevation of the same embodiment of the stud element when viewed along line 16—16 of FIG. 15;

FIG. 17 is a view in elevation of the stud element of FIG. 15 as viewed along line 17—17 and shown in installed position in a panel;

FIG. 18 is still another view in elevation of the same stud element when viewed along line 18—18 of FIG. 15;

FIG. 19 is a view in partial section of the device shown in FIG. 17 when viewed along line 19—19;

FIG. 20 is an elevation in partial section showing the interaction of the detent and stop means of the device shown in FIG. 14 during installation in a panel;

FIG. 21 is an elevation in partial section illustrating the normal position of the detent means when in engagement with the edge of the panel aperture and showing in phantom the position of the detent means when the device is subjected to retrograde rotation;

FIG. 22 is an elevation in partial section of a modified form of cantilever detent means;

FIG. 23 is a perspective exploded view of a modified embodiment of the anti-rotation means acting between elements of the present invention;

FIG. 24 is a perspective view of the stud element of the device shown in FIG. 23 when viewed from the opposite side;

FIG. 25 is an exploded perspective view of a further embodiment of the present invention utilizing a modified means of assembly;

FIG. 26 is an elevation in partial section of the device illustrated in FIG. 25 showing the locking assembly means;

FIG. 27 is an elevation view in partial section showing still another modification to the assembly means between the support element and stud element;

FIG. 28 is a sectional view of the shank of the stud element of FIG. 16 as taken along line 28—28 and illustrating anti-shift means, with the apertured panel being shown in phantom;

FIG. 28A is a similar sectional view of the shank of a stud element including a modified polygonal shank with anti-shift means;

FIG. 29 is another sectional view of the shank of a stud element including modified anti-shifting means when applied to an apertured panel shown in phantom;

FIG. 30 is a sectional view of a wedge type cam shaped shank which is cored to provide torsional engagement with the aperture of the workpiece panel;

FIG. 31 is an elevational view of a further modification to the anti-shifting means; and FIG. 32 is an elevation in partial section showing the use of sealing material with an embodiment of the invention.

Referring now to the drawings, the multi-piece support member or assembly generally designated 10 includes the support element 12 and the fastening means or stud element 14. The support element 12 has a base 16 provided with a counterbored cavity 18 opening through one face thereof and a support means 20 extending outwardly in the opposite direction. The support means 20 in the illustrated embodiment is a single post like member adapted to project outwardly from the work panel with which the assembly is associated. The post 20 could be replaced by a cradle type support element, a hook type support element or any other form of support as is well known in the art. For conservation of materials, the post 20 is cored out by a counterbored portion 22.

Surrounding cavity 18, there is provided an assembly means or rim 24 for purposes best set forth hereinafter. In the present embodiment a tapered deformable rim 24 extends outwardly from base 16 in the opposite direction from post 20. The structure and function of rim 24 will be discussed in greater detail hereinafter. The bottom surface of cavity 18 is provided with suitable driving means for preventing relative rotation between the support element and the stud element. In the present embodiment, driving means 26, such as tangs or key like members, are symmetrically disposed and extend into the cavity. Driving means, such as the flats 27, are provided on the exterior of the base for engagement by complementary tool means, not shown.

The fastener or stud element 14 includes an enlargement or head 28, complementary in configuration to the cavity 18 and adapted to be accepted therein, and a shank 30, integral with and extending outwardly from the head 28. The head 28 is also provided with driving means 29 which are adapted to cooperate with the driving means 26 located in the cavity 18. In the present instance, the driving means 29 are key ways or slots adapted to be engaged by the tangs or keys 26.

One or more lugs or arms 32 project laterally outwardly from the shank 30 at the end thereof remote from the head 28. The lugs 32 are each provided with a cam surface or ramp 34 which tapers upwardly in the direction of rotation of the fastener or stud element 14. The cam surface 34 terminates in a land or shoulder 36 which is in spaced opposition to the under surface of the head 28. At the radial edge of land 36 circumferentially remote from its juncture with the ramp 34 there is provided a stop means or wall 38 which extends upwardly from the land toward the under surface of head 28. The function of said stop means 38 will become clear from the following description.

Referring now to FIG. 4 the fastener means or stud element 14 is axially telescoped with the support element 12 by moving the head 28 into the cavity 18. It is aligned so that the keys or tang 26 engage the slot or key way 29 so as to prevent rotation between the two parts after assembly. It will be noted that the cavity 18 may, if desired, be provided with a slight axial undercut which because of the resiliency of the material will spread outwardly at its outermost extremities so as to permit a snap fit pre-assembly engagement of the head 28 within the cavity 18. To permanently assemble the two elements the rim or lip 24 is deformed radially inwardly. This can be accomplished by either cold forming or hot forming the rim so that it overlies the under surface of the peripheral margin of the head 28. This is most clearly shown in FIG. 2. Such forming of the rim 24 can be accomplished as a secondary operation by known means not shown, or can, if desired, be accomplished by cold forming rim 24 during the installation of the assembly in an apertured work panel.

An assembled fastener, of the type previously described, either with or without the forming of the rim 24, is designed to be utilized with an apertured panel 40. The panel 40 is provided with an aperture 42 having a generally circular central portion 44 and a pair of lateral recesses 46. The lateral recesses are generally fan shaped with opposed edges 48 and 50 diverging outwardly from the point of communication with the central circular portion 44. The lugs 32, in section, are designed to be complementary to the lateral recesses 46 so as to permit axial telescopic assembly of the fastener into the workpiece aperture. When the base 16 approaches the surface of panel 40 the assembly can be rotated and the cam surfaces or ramp 34 will draw the assembly into tight engagement with the panel 40. Rotation is continued until the lands 36 underlie the panel and stop means 38 are brought to bear against the edges 48 in the lateral recesses, thus stopping further rotation.

It will be noted that the head 28 is spaced a considerable distance from the opposing lands 36. In previous devices known in the art, it was necessary to maintain the space between the under surface of head 28 and the land or shoulders 36, in opposition thereto, a distance approximately equal to the thickness of the work panel with which it was to be associated. In normal practice, the panel 40 generally has a thickness in the range of 0.025–0.035 inch. Hence, the tooling necessary to fabricate such a fastener was of rather flimsy construction. In the present device, the under surface of head 28 is generally spaced from the opposing lands 36 a distance equal to or in excess of 0.100 inch. While the fastener is still utilized with thin panels, the head 28 is telescoped into the cavity 18 with the peripheral margins of the base 16 and its outwardly extending rim 24 making up this gap differential. Thus, a single form of fastener element 14 can be utilized for a variety of panel thicknesses by controlling the depth of cavity 18, as for example, by varying the depth of the core pin utilized to fabricate the said cavity 18.

As has been previously suggested, a fastener of this type is ideally adapted to be associated with the inner liner 40 of a refrigerator having an outer shell or body 54 and insulation 56 positioned between the shell 54 and inner liner 40. The post or support means 20 is adapted to accept shelving 58 of the type schematically displayed in FIG. 2.

All of the embodiments of the invention can be injection molded of plastic materials, but, other techniques or methods of manufacture can be utilized if the materials selected are compatible to method used. As was stated previously, it is further contemplated that there will be two pieces, whereby the support element can, if desired, be fabricated from materials differing from those utilized in fabrication of the stud element 14. The preferred materials for these elements are a high impacted polystyrene to be utilized in fabrication of the support element 16 and a nylon material for fabrication of the stud elements 14. This selection provides the most desirable qualities of the materials to be utilized in specific areas. Polystyrene having a tensile strength of approximately 4200–4400 lbs. per square inch is utilized for the support elements while nylon having a tensile strength of approximately 10,500 lbs. per square inch in a dry condition at room temperature or 8,000 lbs. per square inch tensile strength at an equilibrium moisture content at room temperature of approximately 2½% moisture content by weight at a 50% relative humidity is desirable for the stud elements. The economics indicate that the nylon, while more expensive, provides the fastening strength required in a compact member and the polystyrene provides the smooth high impact qualities desirable for use in exposed areas normally accessible to the user. If the polystyrene were utilized for the entire unit a much larger stud element would be required. Thus it is possible to utilize the strength of nylon for the stud element for fastening and to provide a smaller part. For example, the cross sectional area of the shank based on the higher tensile strength of nylon is mechanically equal to the strength of the weaker polystyrene material which requires a greatly increased area to provide the same strength in the base and support element. Other materials having combinations of these desirable qualities will be apparent to those skilled in the art.

A modification to the assembly means 24 and driving means 26 is generally set forth in FIGS. 5 and 6. The rim 24a is tapered to a feather edge and the base 16a provided with a relieved portion or groove 52 which surrounds or encompasses the rim 24a and adds to the flexibility thereof. The rim 24a provides an undercut in cavity 18a adapted to accept the head 28a in snap fastened pre-assembled relation prior to forming of the rim 24a for retentive purposes. Rim 24a when deformed radially inwardly will generally assume a position of the type shown in phantom lines. It will be noted that in this embodiment the rim 24a with its feather edge extends downwardly below the lower outer edge of base 16a. Because of the flexibility of the feather edge it is suitable when in engagement with the panel surface for purposes of sealing the aperture in the panel, when the assembly is associated therewith.

The modification to the driving means 26a, in the bottom surface of the cavity 18a is shown in FIG. 6. The driving means 26a includes a plurality of radially extending cam and ratchet surfaces 60 which are basically triangular in cross sectional configuration and of increasing size as they progress radially outwardly. The function of the support element 12a is substantially identical in that the head 16a of stud element is assembled into the recess 18a and is provided with a complementary configuration of grooves 61, shown in phantom in FIG. 5, on its upper surface for engagement with the groove means 60 in the base cavity.

It has been found in practice that due to variations in the manufacturing tolerances of the sheet material and fasteners, the stud elements 14 sometimes do not provide sufficient retentive power to overcome vibrational conditions and hence becomes loosened. While some loosening is tolerable, it must be controlled within limits. Thus the preferred embodiments of the invention contemplate the use of a secondary stop or detent means 64 which is adapted to drop into the lateral recess 46 and engage the edge 50 opposite to edge 48 engaged by stop means 38. Referring now to the embodiment shown in FIG. 7 wherein similar parts are designated by similar numerals with the addition of the suffix "b." The support member 10b includes a support element 12b having a cavitied base 16b and outwardly extending post 20b. The stud element 14b similarly has a head 28b complementarily acceptable within cavity 18b, a shank 30b and laterally extending cammed lug 32b. Extending upwardly from the land 36b of each lug is a substantially rigid stop member 38b. The detent means 64 is circumferentially spaced between the adjacent stop means 38b. This circumferential distance from the closest stop means 38b is approximately equal to the distance on an arc measured between opposite side edges 48b–50b of the lateral recess in the panel aperture, for purposes best set forth hereinbelow.

In this particular embodiment, the cooperating driving means between the support element 12b and stud element 14b is provided by a slot or key way 26b in the cavity 18b and a cooperating tang or key 29b projecting from the head 28b of the stud element 14b.

The detent means 64 in this embodiment is in the form of a U-shaped strap element depending from the under surface of 28b and terminating in a curved surface in opposition to a plane transverse to the axis of the fastener and passing through the land 36b. The detent means is flexible so that it can be deflected toward the head when the fastener is being installed in aperture 42 of the panel 40 and it will be noted that due to its radial spacing inwardly from the peripheral margins of head 28b that it will be accommodated in the void within the cavity 18b during installation, for evidence of such cavity see FIG. 2. After the fastener has rotated so that the stop means 38b is in engagement with edge 48b of the aperture the detent means 64, due to its resilient nature, will drop downwardly and engage edge 50b of the aperture. This latter effect can be clearly seen in FIG. 8. While the illustrative embodiment discloses the use of two detents 64 symmetrically disposed intermediate the lugs 32b it will be apparent that one detent 64 would be sufficient in most circumstances. The detent 64 can be collapsed to permit removal of the fastener assembly from the workpiece but requires the application of a sufficiently great torsional force for such distortion that it normally prevents unintentional retrograde rotation due to vibrational or other operational means.

Several other forms of suitable detent means are disclosed in FIGS. 9–13 wherein similar parts are designated by similar numerals with the addition of letter suffixes to distinguish the parts. The device as shown in FIG. 9 is related to the ones shown in FIGS. 7 and 8 in that it is basically a U strap of material 64c connected at its opposite ends 66 to the undersurface of the head 28c. In this embodiment the detent means 64 is initially connected as at section 68 to the shank 30c. Section 68 can be frangible so as to separate from shank 30c or, alternatively, depending upon the material used in stud element 14c, it can be deformable and still function properly. It has been found that section 68 when deformed tends to stretch the material from which it is manufactured.

When the head 28c is assembled with an appropriate support element 12 and the assembly is inserted in the workpiece the frangible section 68 is fractured or deformed and the U-shaped detent means 64c is permitted to flex upwardly until such time as the appropriate stop means has engaged one edge of the lateral recess. Thereupon the detent means 64c will spring downwardly and engage the opposite edge in the recess. The use of frangible or deformable characteristics of section 68 simplifies the formation of the detent means 64c and eliminates the necessity of a thin weak mold portion between the detent means 64c and the shank 30c of the fastener. This technique can be utilized with any of the detent forms as described herein.

FIG. 10 discloses the use of a hollow cylindrical detent 64d which is generally tangentially attached to the under surface of head 28d. Another modification, shown in FIG. 11, also utilizes a hollow cylinder 64e with the axis of the cylinder 64e falling in a plane which bisects the head 28e perpendicular to the axis of the shank 30e. In this embodiment, the lower portion of the cylinder functions as the detent means 64e while the upper half of the cylinder serves as the driving means 29e to cooperate with suitable slot means in the cavity of a support element.

A further modification to the detent means is seen in FIG. 12. In this embodiment, the detent means 64f assumes the form of a truncated triangle with its upper apex removed or merged into the head 28f. In this form, the depending sides of the triangle form abrupt undercut surfaces for substantially rigid engagement with the appropriate edge of the lateral recess in the panel aperture.

Still another form of detent means is shown in FIG. 13 wherein the detent 64g is substantially L-shaped in cross section configuration. One leg of the L 72 is affixed to the under surface of the head 28g while the second leg 74 extends circumferentially in cantilever fashion. In this embodiment, the cantilever leg 74 is adapted to abut the edge of the lateral recess by means of the edge 76 at the free end of the cantilever portion.

The preferred embodiment of the invention is disclosed in FIGS. 14–20 wherein similar parts are designated by similar numerals with the addition of the suffix "h." The support assembly 10h includes the support element 12h and the fastener or stud element 14h. The support element 12h includes a base 16h having a cavity 18h opening through one end face thereof and a post or support means 20h extending outwardly in the opposite direction from the cavity 18h. The stud element 14h includes a head 28h, a substantially cylindrical shank 30h, and a pair of laterally extending lugs 32h each having a circumferentially disposed cam surface or ram 34h terminating in a shoulder or land area 36h in spaced opposition to the under surface of head 28h. In addition, each land area 36h teminates in a vertically extending stop means 38h disposed along the radial edge of land 36h circumferentially remote from the ramp 34h. These features are similar to those previously disclosed in the other embodiments.

In this embodiment, the driving means includes a pair of flat wall surfaces 78 in the cavity 18h and a pair of complementary flats 80 on the head 28h for cooperating with the walls 78 to prevent relative rotation of the support element 12h and stud element 14h when assembled. It will be appreciated that other non-circular configurations or interlocking means could be adapted for such usage. The assembly of these two parts into an integral unit follows the plan generally set forth hereinabove wherein the head 28h is telescopically associated with the cavity 18h and the rim 24h is then formed inwardly to overlie the under surface of the head 28h to retain same in non-rotatable assembly with the base 16h.

The detent element 64h in this embodiment has a substantially semi-teardrop configuration in section and is formed by a strap-like element substantially greater in width than in thickness. One end 84 of the detent means 64h is formed integral with the stop means 38h on the side opposite to the land 36h. This strap-like portion continues circumferentially about the head and depends downwardly away from the head to a point remote from the stop means 38h where it curves upwardly with the opposite extremity 86 being integrally affixed to the under surface of the head 28h. This reversely bent portion forms a shoulder or protuberance 88 with said shoulder 88 being positioned at a point below or in line with the plane defined by the panel 40h with which the fastener is to be associated and land area 36h.

To assist in understanding the operation of this device, FIGS. 20 and 21 are developed planar views of one of the lugs 32h and the detent means 64h. As in the other cases, the stud element 14h is telescoped into the aperture 42h. During this telescopic operation, the forward cam surface 34h is assisted by a corresponding cam surface 90 on the back surface of the lug 32h circumferentially spaced from the cam surface 34h. This induces immediate rotation of the stud element 14h by cooperation between the cammed surfaces 34h and 90 with lateral recess panel edges 48h and 50h respectively. The axially insertion or telescoping of the assembly brings the reversely bent portion 88 of the detent means 64h into engagement with the upper surface of the panel, as best seen in FIG. 20, and distorts the detent means 64h into a waved form. The fastener is rotated until the stop means 38h is brought into engagement with the edge 48h and at this time the detent means tends to revert to its normal position by flexing downwardly with reversely bent shoulder means 88 in opposition to the edge 50h of the lateral recess of the aperture. The circumferential distance measured between the forward edge of the stop means 38h and the shoulder means 88 of the detent is substantially equal to or slightly less than the measurement of the arc intersected by the opposite side edges 48h and 50h of the lateral recess in the aperture. Retrograde rotation of the said element 14h causes the detent means 64h to flex downwardly and to assume the position shown in phantom in FIG. 21. Thus, retrograde rotation tends to increase the resistance offered by the detent means 64h to removal of the fastener by increasing the area of contact with the panel edge. Due to the cammed nature and waved action form of the detent means the fastener can be removed by application of sufficient force. In some instances, the end 86 attached to the head 28h will be sheared during removal of the fastener from the panel, however, the fastener is still reuseable since the detent means will still provide a shoulder 88 for opposition to the edge of the recess even though it is not supported by attachment of end 86 to the head 28h. This embodiment of the invention has the additional advantage that the attachment of end 84 of the detent means 64h to the backside of the stop 38h along with the attachment of the end 86 to the head 28h affords a strut effect to the detent and more positively locks the stud element 14h in final assembled position.

Shear loads which are applied to this fastener are generally transmitted through the shank 30h to the central circular portion 44h of the aperture, however, the outer or lateral edge 92 of the detent means 64h engages the edge of the lateral recess as indicated at 46h, and assumes a portion of the shear loads.

The detent 64h is preferably molded with a frangible or deformable section between it and the shank portion 30h, of a type previously described. This frangible connection is fractured or deformed when the fastener is inserted in the aperture and the detent 64h assumes the waved form shown in FIG. 20.

A modification to the teardrop detent means is shown in FIG. 22 wherein similar parts are designated by similar numerals with the addition of the suffix "i." In this device the detent 64i is integral at one end 84i with the back side of stop means 38i. Differing from the last embodiment, the opposite end 86i is not affixed to the under surface of head 28i but rather is free to permit a cantilever action by detent 64i. A catch or stop 89 is provided to overlie panel 40i to prevent the reversely bent shoulder means 88i of detent 64i from dropping below panel 40i when the assembly is subjected to retrograde rotation.

Another embodiment of the invention is disclosed in FIGS. 23 and 24 wherein similar numerals are utilized to designate similar parts with the addition of the suffix "j." In this embodiment, the support element 12j is provided with a non-circular recess 18j having flat side walls 78j and the head is complementary in configuration and equipped with cooperating flats 80j. The shank and lugs carried thereon along with the associated stop means are substantially identical to the previously disclosed embodiment.

In certain instances, it is desirable to provide extra strong driving means, hence, this embodiment not only has the cooperating flat walls 78j and flats 80j but it is also provided with cored out holes or recesses 96 in the head 28j adapted to complementarily receive a pair of driving tangs 98 which are upstanding from and project into the recess 96. The fastener is also provided with detent means 64j. These detent means 64j are integrally molded cylindrical projections depending from the under surface of the head 28j. Their function is substantially identical to the previously described detents in that they will flex toward the head during insertion of the device in an apertured panel having lateral recesses to accept the lugs 32j and will spring downwardly into the lateral recesses 46j into engagement with the side edge 50j when the stop means 38j is in engagement with the opposite side edge 48j.

Another form of assembly and driving means can be seen in FIGS. 25 and 26 wherein similar parts are designated by similar numerals with the addition of the suffix "k." In this device, the base 16k is non-circular or square and its recess 18k is provided along 3 sides thereof with a slot or groove 100. Cavity 18k is open along one edge thereof so as to provide communication with the slot 100. The support means or post 20k is counterbored as at 22k to conserve material and for other purposes best set forth hereinafter. The head 28k of the stud or fastener element 14k is non-circular, in the present instance square, and is adapted to be slid through the open edge of the cavity 18k and is complementary in axial thickness and peripheral configuration with the slot 100. The upper surface of the head 28k, opposite to the shank 30k, is provided with a flexible protuberance or shoulder 106 which is adapted to flex during insertion of the head 28k in slot 100 and is so positioned that it will return to normal position by expanding into and cooperating with bore 22k to lock the stud element 14k in assembled non-rotative relation with the support element 12k. The lug and detent configuration of this embodiment as well as its operation is substantially identical to the embodiments previously described.

While all of the previous embodiments have either utilized interlocking tangs and slots, non-circular heads and cavities, or as in the case of the last described embodiment, an interfitting slide, the embodiment shown in FIG. 27, wherein similar parts bear similar numerals with the addition of the suffix "x," illustrates the use of a screw threaded connection 110 between the head 28x and the cavity 18x of the support element 12x. By utilizing threads of the same hand as the cam surfaces 34x, the bottoming of the head 28x against the base of the cavity 18x will frictionally provide a substantially non-rotative interfitting for operation of the device. The base 16x is provided with a resilient and deformable depending annular protuberance or lip 111. Said lip 111 serves a dual purpose of being adapted to seal the aperture in the panel and also to act as a take-up means to compensate for tolerance variations in panel thicknesses. This embodiment may also include an annular recess or groove, not shown, of the type seen in FIG. 4 to be positioned adjacent lip 111 and adapted to accept excess material of lip 111 displaced when said lip is deformed by contact with the work panel.

While all devices of this nature can be theoretically designed to be utilized in specific hole sizes, it is common knowledge that manufacturing tolerances will occasionally become mismatched and sloppy or loose fits will be produced. Other causes include enamel or porcelain flashing projecting into the aperture, in the case of coated metal panels. To overcome such tolerance variations, it is proposed that anti-shifting means be provided on the shank portion of the fastener means to cooperate with the walls of the aperture so as to eliminate wobble and lateral shifting. An embodiment of such a device is shown in FIGS. 15, 16 and the sectional view FIG. 28 which utilizes opposite disposed diametral wedges 114 which are axially disposed on shank 30h. These wedges engage the edge wall of the central circular portion 44h of the panel 40h as shown in phantom. The diametral wedges 114 will generally be deformed or sheared at the appropriate position along their axial extent so that the shank 30m will conform more accurately to the aperture portion 44m.

A modification of the shank is shown in FIG. 28A. In this embodiment the shank 30t is polygonal in transverse section and provides a plurality of axially extending corners or ridges 115. While the shank 30t would be rotatably acceptable within an oversize hole, it has been shown in sectional relation to a normal aperture 44t, shown in phantom. The ridges 115 are preferably disposed on an imaginary circle which has slightly larger diameter than the diameter of aperture 44t whereby when the shank is inserted in the aperture the ridges 115 are either distorted or sheared and will conform to the exact hole size after the shank 30t is rotated into final position with stop 38t engaging one edge of the lateral recess. Thus, the shank 30t can be provided with any number of sides which are compatible from a hole size and material utilization standpoint.

The modification as shown in FIG. 29 utilizes a pair of crushable or deformable ribs 116 which will flex inwardly into the relieved slots 118 when the shank 30n is rotated in the aperture, whereby the shank 30n will conform to the hole shape after installation.

The anti-shifting means disclosed in FIG. 30 is a second departure from the substantially cylindrically shaped shank previously described for other embodiments of the invention, except as shown in FIG. 28A. In this device the shank is provided with circumferentially cammed or wedged shape, axially extending, portions 120 and is cored out adjacent thereto to provide axially extending slots 122. When the fastener is inserted in a workpiece aperture as shown in phantom, the wedge type cam surfaces of the shank will be collapsed inwardly toward the cavities 122 until they conform to the cylindrical configuration defined by the central portion 44p of the aperture, as shown in phantom. In this embodiment, the torsional effect created by this collapsible wedge type camming shank assists the stop means 38p and the shoulder 88p of the detent means 64p in preventing retrograde rotation.

Still another modification to the anti-shifting means is shown in FIG. 31, wherein the shank 30r is provided with a circumferentially disposed rib 126 which is crushed or distorted between the edge wall of the panel aperture with which it is associated and the shank 30r so as to provide a positive and firm fit.

As was previously mentioned, the manufacturers of refrigerating devices in attempts to reduce costs are leaning in the direction of utilizing insulation which can be foamed in place between the inner liner 40 and the outer shell 54. This, of course, involves a chemical reaction. The raw material is placed between the walls of the inner line 40 and the shell 54 and a foaming agent added which reacts with the raw material to expand same and form the cellular configuration ideal from an insulation standpoint. To accomplish this, however, all fasteners and other elements requiring access holes in the inner liner must be installed prior to the foaming in place of the insulation so as to seal these apertures and prevent the egress of the foamed insulation. This is one of the reasons why it has been indicated heretofore that the deformed rim 24 and lip 111 when in engagement with the surface of the inner liner 40 acts as a sealing means. Because of some of the foaming agents being utilized, however, it is necessary to properly select the material for the fastener. In the illustrated material combinations, it is preferable to isolate the polystyrene support element 12 from such foaming agent. To facilitate this, the embodiment illustrated in FIG. 32 shows the application of a sealant or mastic material 130 which is flowed or applied into the cavity 18s and isolates the base 16s of the polystyrene support element 12s from contact with any of the foaming agent by sealing the aperture of panel 40s. The nylon material of the stud element 14h is substantially inert to the action of the foaming agent and hence does not require a protective measure.

The various modifications and embodiments of the invention described hereinabove illustrate a multi-piece fastener unit adapted to be utilized as support means in thin wall enclosures. The support elements and fastener elements can be non-rotatably assembled and are provided with suitable driving means for rotation as a unit in a prepared apertured panel. They are applicable from the blind side of the panel and can be removed and reused in a differing location where adjustable shelving is desired. In addition, sealing means are provided to isolate the panel apertures for purposes of insulation and, additionally, secondary sealing means are provided to permit the use of foamed insulation.

While the described embodiments can be removed, if desired, they are preferably provided with means for prevention of unintentional retrograde rotation and thus can withstand the shocks of transportation and normal vibration incurred in service. The utilization of differing materials permits present day economy in fabrication while providing the ultimate consumer with sanitary aesthetically desirable supporting means. It should be noted that the fastener can be fabricated from a single material, but the two piece design not only permits the design of stronger tooling but also permits the use of specific materials for the strength and aesthetic requirements of the fastener. The economies indicated in fabrication are also present in the assembly of the fastener. It can be readily assembled with the work panel with simple tools and a minimum rotation, hence, economies of assembly are provided and available to be passed on to the ultimate consumer.

While other embodiments will be apparent to those skilled in the art, it is my intent that I be limited by the appended claims.

I claim:

1. A multi piece plastic support member adapted to be used in an apertured panel with said aperture having a central substantially circular portion and at least one lateral recess, said member including in assembly a support element and a stud element, said support element including a base adapted to abut said apertured panel, a cavity in said base on the side adapted to abut said panel, support means extending outwardly from said base in a direction away from said panel, said stud element having a head and a shank, said head adapted to be complementally accepted within said cavity in the base of said support element with said shank extending outwardly from said head in a direction opposite to said support means and adapted to be complementally accepted in said panel aperture, means on said head for inducing rotation of the shank, means for retaining said head and said base in assembled relationship, at least one lug complementary to said aperture recess extending laterally from said shank and presenting means axially spaced from and in opposition to the under side of said head, a substantially rigid stop means positioned adjacent one edge of said means and extending upwardly from said means toward said head whereby rotation of the shank after telescopic association of the shank and lug with the complementary apertured panel causes the means of the lug to underlie the panel and the stop means to limit said rotation by engagement with the panel edge forming the lateral recess in the aperture.

2. A device of the type claimed in claim 1 wherein said means for retaining said head and said base in assembled relationship includes a deformable retaining rim initially extended outwardly away from said recessed base and adapted to be formed inwardly after insertion of the head of said stud element into the cavity of said base to retain the stud element and support element in assembled relation.

3. A device of the type claimed in claim 1 wherein said head of the stud element and the cavity of the base are provided with complementary interengaging means for preventing rotation between the support element and stud element when they are assembled, said interengaging means including said means on said head for inducing rotation of the shank.

4. A device of the type claimed in claim 3 wherein said interengaging means comprises either the cavity of the base or the head of the stud element having a key way and the other element having a key for interengagement therewith.

5. A device of the type claimed in claim 3 wherein said cavity in said base is provided with a non-circular configuration and the head of said stud element has a complementary external configuration to mate non-rotatably with said base cavity to form said interengaging means, said base on its exterior being provided with means for rotatably driving the support element and stud element as a unit following their assembly.

6. A device of the type claimed in claim 3 wherein either the base cavity or the head of said stud element are provided with one or more cored out holes and the opposite element is provided with a complementary driving lug to fit into said hole, said base having means for rotatably driving same with suitable tool means whereby said assembled support element and stud element can be rotated as a unit.

7. A device of the type claimed in claim 1 wherein said stud element is provided with detent means adapted to engage the opposite edge surface of the lateral recess in the panel aperture after the stop means has engaged one edge surface of the lateral recess whereby said fastener will not be subjected to unintentional retrograde rotation after installation.

8. A device of the type claimed in claim 7 wherein said detent means extends downwardly from the under side of said head adjacent said shank and is spaced circumferentially about said shank from said stop means a distance equal to the spacing between opposite edge surfaces of said lateral recess in the panel aperture.

9. A device of the type claimed in claim 7 wherein said detent means has a semi-tear drop shape in section.

10. A device of the type claimed in claim 9 wherein said semi-tear drop detent is formed by a strap like member connected to said stop means adjacent said head and extending circumferentially about said shank while tapering downwardly away from said head to a point where it is spaced an axial distance from said head approximately equal to the axial spacing of said means in opposition to said head and thence is reversely bent upwardly and connected to the under side of said head, said detent being flexible and adapted to be compressed during insertion of the shank with the panel aperture, said detent being adapted to spring downwardly away from said head into said lateral recess when positioned over said recess with the reversely bent portion in engagement with an edge of said lateral recess in the panel aperture whereby said stud element is precluded from unintentional retrograde rotation.

11. A device of the type claimed in claim 1 wherein said shank is provided with means spaced from said lug means for engagement with the edge forming the circular portion of said panel aperture to prevent lateral movement of the shank after rotation.

12. A device of the type claimed in claim 1 wherein said base cavity is of non-circular configuration and is provided with slot means opening through one edge and communicating therewith, said head of the stud element being complementary to the non-circular configuration of the cavity and adapted to be slid into said cavity by said slot means, means for locking said head in said base cavity subsequent to its association therewith.

13. A device of the type claimed in claim 1 wherein the support element and stud element are each integral units fabricated of differing plastic materials.

14. A device of the type claimed in claim 13 wherein the stud element is a one piece device fabricated of nylon and the support element is a one piece member fabricated of polystyrene.

15. A multi piece plastic support member adapted to be used with an apertured workpiece, the aperture in said workpiece having a central circular configuration and a pair of lateral fan-shaped recesses oppositely disposed of said central circular portion with the mouth of each recess being smaller than its outermost edge, said support member including an assembly of a support element and a stud element, said support element having a base with a cavity adapted to abut said work panel with the cavity on the side of the work panel, support means extending outwardly from said base away from said work panel, said stud element including a head and a shank, said head being adapted to be complementally accepted within the cavity of said base, a pair of lugs extending outwardly in opposite directions from said shank in spaced relation from the under side of said head, each of said lugs having a cam surface commencing adjacent the extremity of the shank and tapering upwardly toward said head and terminating in a land which is in substantially parallel spaced opposition to the under side of the head, substantially rigid stop means extending upwardly from a radial edge of said land toward said head, detent means extending downwardly from said head toward said lands and spaced circumferentially about said shank from said stop means, means on said stud element for rotatably driving same, means on said head and said base for retaining same in assembled relationship whereby rotation of the assembled member after the telescopic association of the shank and lugs with the laterally recessed panel aperture results in the engagement of the lands on the lug with the under surface of the panel and the engagement of the base with the upper surface of the panel, said stop means limiting rotation in the direction of assembly and the detent means limiting retrograde rotation by acting upon opposite edge surfaces of the aperture's lateral recesses.

16. A device of the type claimed in claim 15 wherein said base is provided with an initially outwardly extending deformable rim surrounding said base cavity, said rim adapted to be deformed inwardly subsequent to the insertion of said head into said cavity, thereby forming said means for retaining said head and said base in assembled relation.

17. A device of the type claimed in claim 16 wherein said deformable rim is tapered toward its extremity and after assembly deformation it extends outwardly beyond said base in the direction of said shank of the stud element, the extremity of said rim being adapted to be further deformed upon association of the support member with the work panel whereby said rim will conform to the surface of the work panel and seal the aperture in said work panel.

18. A device of the type claimed in claim 16 wherein said cavity in the base and the head of the stud element are complemental and non-circular, complementary driving means on the support element adapted to facilitate rotation of the assembled support element and stud element.

19. A device of the type claimed in claim 16 wherein the cavity in the base and the head of the stud element have complementary key slot and key configurations for preventing rotation between the two elements, driving means on said support element for inducing rotation of the two elements when in assembled relation.

20. A device of the type claimed in claim 16 wherein said shank is substantially circular in cross section, said lugs being symmetrically disposed on opposite sides of said shank, said lugs and said shank defining a spiral generation of the work panel aperture and its lateral recesses, the upper end of each of said lugs terminating in a land in axially spaced opposition to the under surface of the head.

21. A device of the type claimed in claim 15 wherein each of said lug means are provided with a cam surface tapering upwardly away from the extremity of said shank and terminating in a land which is spaced in opposition to the under side of the head, the axial distance between said land and surface of the under side of the head normally being greater than the thickness of the workpiece with which it is to be associated, the cavity in the base being controlled so that the outer surface of the base will be axially spaced from said lands when the stud element is associated with the support element a distance substantially equal to the thickness of the workpiece.

22. A device of the type claimed in claim 21 wherein the retaining means includes a deformable rim initially extending outwardly from said base around said cavity and adapted to be deformed radially inwardly of the head after its positioning in the cavity of the base, said rim being tapered toward its extremity and extending outwardly from said base toward said lands after its initial deformation so that it might be flexed toward said base to form a seal with the outer surface of the workpiece when the fastener has been associated with the panel.

23. A device of the type claimed in claim 22 wherein means are provided on said shank circumferentially intermediate the stop means for engaging the circular edge portion of the panel aperture to prevent lateral shifting of the shank in said aperture.

24. A device of the type claimed in claim 23 wherein the stop means on the lands are integral with the lugs, shank and head and are oppositely symmetrically disposed, said shank being substantially circular in cross section, said means for engaging the circular portion of the aperture including symmetrically disposed prong like elements extending outwardly beyond the circular shank with cammed surfaces increasingly cammed in the direction of rotation of the shank, said prong like members being deformable upon rotation of the shank within the aperture.

25. A device of the type claimed in claim 23 wherein said shank is substantially circular and complementary to the panel aperture and said lugs with their associated stop elements being symmetrically disposed on opposite sides of said shank, said means for engaging the circular portion of the panel aperture including a pair of oppositely symmetrically disposed protuberances spaced between the under surface of said head and the lands of said lugs, said protuberances being cammed in the direction of rotation of said shank and having a substantial circumferential and axial extent about said shank.

26. A device of the type claimed in claim 15 wherein said detent means includes a hollow flexible tubular element radially disposed and extending downwardly from said head and spaced circumferentially from said stop means.

27. A device of the type claimed in claim 26 wherein said tubular means is initially integral with said shank and connected thereto by means of a distortable or frangible section, said section being adapted to be moved during flexure of the tubular means between the head and the workpiece, said tubular means being further adapted to flex axially outwardly from the head into the lateral recess of the panel aperture after rotation of the stud element in said aperture.

28. A device of the type claimed in claim 15 wherein said detent means is a cantilever strap means extending circumferentially about said shank from said stop means, shoulder means at the terminal end of said cantilevered strap, whereby insertion of said stud element in the apertured panel deforms the strap means upwardly toward said head until rotation of the stud element in the panel aperture results in the engagement of the stop element with one edge of the lateral recess whereupon said cantilevered strap will spring downwardly and its shoulder means will abut the edge of the lateral recess opposite to the edge of said recess engaging the stop means thereby preventing unintentional retrograde rotation.

29. A device of the type claimed in claim 15 wherein each of the lugs on said stud element are provided with a cam surface tapering upwardly from adjacent the extremity of the shank opposite the head and terminate in a land axially spaced from the under surface of said head, each of said stop means being integral with the radial edge of said land circumferentially spaced from said cam surface and extending from said land up to the under surface of said head in a substantially rigid condition, each of said detent means being flexible and including a deformable strap like portion attached to said stop means on the side opposite the land and extending circumferentially about said shank downwardly away from said head and thence upwardly toward said head with the terminal end thereof opposite the connection with said stop being integral with and connected to said head, said portion of the detent which is reversely bent upwardly toward and attached to said head forming shoulder means circumferentially spaced from said stop, the distance between said stop and said shoulder means of the detent being approximately equal to the spacing between opposite edges of the lateral recess in the panel aperture, said detent being adapted to be flexed upwardly toward said head during telescopic insertion of the fastener in the apertured panel with which it is to be associated and thence to spring downwardly when the stud element has been rotated and the stop brought to bear against one edge of the lateral aperture recess whereby the shoulder means is brought into engagement with the opposite edge of the lateral recess and unintentional retrograde rotation thereby prevented.

30. A device of the type claimed in claim 15 wherein the support element and stud element are each integral units fabricated of differing plastic materials.

31. A device of the type claimed in claim 30 wherein the support element is a one piece device fabricated of polystyrene and the stud element is a one piece device fabricated of nylon.

32. In combination an apertured work panel and a multi-piece plastic support member, the aperture in said work panel having a double key hole configuration with a central circular portion and a pair of oppositely disposed fan shaped recesses communicating with said circular portion, said support member including a support element and a stud element, said support element including a base having a cavity on one side of said base adapted to abut the work panel, means for supporting a secondary element extending outwardly from the opposite side of said base away from said panel, said stud element having a head and a shank, said head being complementally acceptable within the cavity of said base, means for retaining said base and head in assembled relationship, a pair of lugs extending laterally outwardly from said shank and axially spaced along said shank from said head, stop means extending upwardly from each of said lugs toward the under surface of said head, detent means circumferentially spaced from said stop means for cooperation with said stop means in engagement with opposite edges of said fan shaped apertured recess in the workpiece aperture, means on said stud element for rotation of same upon insertion of the shank and lugs into the workpiece aperture whereby rotation of the stud element after telescopic association of said stud element into said aperture causes the lugs to underlie the workpiece and to fasten the entire support member in assembled relation with the apertured workpiece, said stop means limiting rotation thereof and said detent means preventing unintentional retrograde rotation.

33. A device of the type claimed in claim 32 wherein the support element and stud element are each integral units fabricated of differing plastic materials.

34. A device of the type claimed in claim 33 wherein the stud element is fabricated of nylon and the support element is fabricated of high impact styrene.

References Cited by the Examiner
UNITED STATES PATENTS

| | | | |
|---|---|---|---|
| 2,098,997 | 11/37 | Bramming | 248—239 X |
| 2,230,916 | 2/41 | Tinnerman | 85—36 |
| 2,626,773 | 1/53 | Backman | 248—239 |
| 2,826,388 | 3/58 | Janos et al. | 248—239 |
| 2,975,933 | 3/61 | Abolins | 248—188.8 X |

FRANK L. ABBOTT, *Primary Examiner.*